(12) United States Patent
Karunakar et al.

(10) Patent No.: US 9,191,686 B2
(45) Date of Patent: Nov. 17, 2015

(54) SYSTEM AND METHOD OF IMPLEMENTING SYNCHRONIZED AUDIO AND VIDEO STREAMING

(75) Inventors: Manjunatha Karunakar, Bangalore (IN); Stephen Mead, Bradenton, FL (US); Prashanth Balanje Ramesh, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 202 days.

(21) Appl. No.: 13/188,777

(22) Filed: Jul. 22, 2011

(65) Prior Publication Data

US 2013/0021525 A1 Jan. 24, 2013

(51) Int. Cl.
*H04N 21/242* (2011.01)
*H04N 21/2368* (2011.01)
*H04N 21/8547* (2011.01)

(52) U.S. Cl.
CPC ......... *H04N 21/242* (2013.01); *H04N 21/2368* (2013.01); *H04N 21/8547* (2013.01)

(58) Field of Classification Search
CPC .......... H04N 21/2368; H04N 21/8547; H04N 21/242
See application file for complete search history.

(56) References Cited

U.S. PATENT DOCUMENTS

| | | | |
|---|---|---|---|
| 4,847,690 A | 7/1989 | Perkins | |
| 4,852,102 A | 7/1989 | Yamaguchi | |
| 5,351,090 A | 9/1994 | Nakamura | |
| 5,357,276 A | 10/1994 | Banker | |
| 5,392,223 A | 2/1995 | Caci | |
| 5,477,263 A | 12/1995 | O'Callaghan et al. | |
| 5,521,927 A | 5/1996 | Kim et al. | |
| 5,561,456 A | 10/1996 | Yu | |
| 5,583,561 A | 12/1996 | Baker | |
| 5,608,448 A | 3/1997 | Smoral | |
| 5,623,690 A | 4/1997 | Palmer | |
| 5,649,029 A | 7/1997 | Galbi | |
| 5,668,601 A | 9/1997 | Okada | |
| 5,724,646 A | 3/1998 | Ganek | |

(Continued)

FOREIGN PATENT DOCUMENTS

| | | |
|---|---|---|
| EP | 0279410 | 8/1988 |
| EP | 0920291 | 2/1999 |

(Continued)

OTHER PUBLICATIONS

"Audio Video Interleave", "Retrieved from http://en.wikipedia.org/wiki/Audio_Video_Interleave on Apr. 4, 2011", Apr. 4, 2011, pp. 13, Publisher: Wikipedia, the free encyclopedia.

(Continued)

*Primary Examiner* — Mark D Featherstone
(74) *Attorney, Agent, or Firm* — Ingrassia Fisher & Lorenz, P.C.

(57) ABSTRACT

A server comprises a processing unit configured to interlace audio data packets with video data to form an interlaced audio/video data file having an approximately uniform audio time interval between consecutive audio data packets in the interlaced audio/video data file. The server also comprises an interrupt timer configured to provide periodic interrupt signals. The processing unit is configured to synchronize the start of transmission of each instance of the audio data packets and the video data packets with the periodic interrupt signals from the interrupt timer.

20 Claims, 3 Drawing Sheets

(56) References Cited

U.S. PATENT DOCUMENTS

| | | | |
|---|---|---|---|
| 5,757,802 A | 5/1998 | Yoo | |
| 5,771,075 A | 6/1998 | Rim | |
| 6,058,141 A * | 5/2000 | Barger et al. | 375/240 |
| 6,163,646 A | 12/2000 | Tanaka | |
| 6,188,703 B1 | 2/2001 | Dobson et al. | |
| 6,269,122 B1 | 7/2001 | Prasad | |
| 6,449,653 B2 * | 9/2002 | Klemets et al. | 709/231 |
| 6,452,974 B1 | 9/2002 | Menon | |
| 6,480,902 B1 | 11/2002 | Yuang et al. | |
| 6,543,053 B1 | 4/2003 | Li et al. | |
| 6,587,958 B1 * | 7/2003 | Oshins et al. | 713/502 |
| 6,661,464 B1 | 12/2003 | Kokkosoulis | |
| 6,701,528 B1 | 3/2004 | Arsenault | |
| 6,920,181 B1 | 7/2005 | Porter | |
| 6,961,324 B2 | 11/2005 | Kilgore | |
| 6,988,278 B2 | 1/2006 | Gomez | |
| 7,020,894 B1 | 3/2006 | Godwin | |
| 7,089,577 B1 | 8/2006 | Rakib | |
| 7,168,086 B1 | 1/2007 | Carpenter | |
| 7,200,857 B1 | 4/2007 | Rodriguez | |
| 7,383,564 B2 | 6/2008 | White | |
| 7,493,647 B2 | 2/2009 | White | |
| 7,711,244 B2 | 5/2010 | Sato | |
| 7,784,079 B1 | 8/2010 | Sipple | |
| 7,793,325 B2 | 9/2010 | White | |
| 7,913,283 B2 | 3/2011 | White | |
| 8,607,083 B2 * | 12/2013 | Kaburlasos et al. | 713/320 |
| 2002/0141491 A1 * | 10/2002 | Corts et al. | 375/216 |
| 2005/0015817 A1 * | 1/2005 | Estipona | 725/136 |
| 2009/0172200 A1 * | 7/2009 | Morrison et al. | 709/248 |
| 2010/0071010 A1 * | 3/2010 | Elnathan et al. | 725/81 |
| 2010/0083332 A1 | 4/2010 | Kling | |
| 2011/0099582 A1 * | 4/2011 | Howcroft et al. | 725/46 |
| 2011/0138433 A1 * | 6/2011 | Whiteing | 725/114 |

FOREIGN PATENT DOCUMENTS

| | | |
|---|---|---|
| EP | 1773072 A1 | 4/2007 |
| FR | 2930098 A1 | 10/2009 |
| WO | 9716023 | 5/1997 |

OTHER PUBLICATIONS

Firestone, "Voice and Video Conferencing Fundamentals ", Mar. 2007, pp. 223-255, No. 7, Publisher: Cisco Press.

EP Search Report and Written Opinion for Application No. EP 12176429.4 dated Jul. 14, 2014.

EP Extended Search Report (Office Action) for Application No. EP 12176429.4 dated Jul. 21, 2014.

EP Examination Report for Application No. EP 12176429.4 dated Oct. 8, 2014.

* cited by examiner

SYSTEM AND METHOD OF IMPLEMENTING SYNCHRONIZED AUDIO AND VIDEO STREAMING

BACKGROUND

High Definition Video On-Demand (HD VOD) systems allow multiple users to simultaneously watch the same or different HD video content. Such systems can provide functionality such as pause, fast-forward, fast-rewind etc. The users' experience is improved when proper lip synchronization is achieved. Lip synchronization refers to matching the visual scene (such as lip movements of a speaker) to the corresponding sound (such as the words spoken by the speaker). Without proper lip synchronization, audio may be heard ahead of or after its corresponding video frame.

To achieve proper lip synchronization, typical HD VOD systems require high performance hardware on a "per stream" basis to support multiple simultaneous streams. In addition, typical HD VOD systems require accurate & high precision timers to manage synchronization between audio and video content. Without such high performance hardware and timers, packets may be dropped or lip synchronization will be lost progressively over time. Lip synchronization may also be lost for every forward and rewind operation. A forward or rewind operation involves jumping ahead, or behind in audio & video content files simultaneously.

However, the usage of a "per stream" high performance hardware pipeline, accurate & precise timers, and complex algorithms needed to achieve proper lip synchronization on a per stream basis can increase the cost of HD VOD hardware significantly. Thus, there is a trade-off between the number of simultaneous streams supported and the hardware required to support the streams.

SUMMARY

In one embodiment, a server is provided. The server comprises a processing unit configured to interlace audio data packets with video data to form an interlaced audio/video data file having an approximately uniform audio time interval between consecutive audio data packets in the interlaced audio/video data file. The server also comprises an interrupt timer configured to provide periodic interrupt signals. The processing unit is configured to synchronize the start of transmission of each instance of the audio data packets and the video data packets with the periodic interrupt signals from the interrupt timer.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
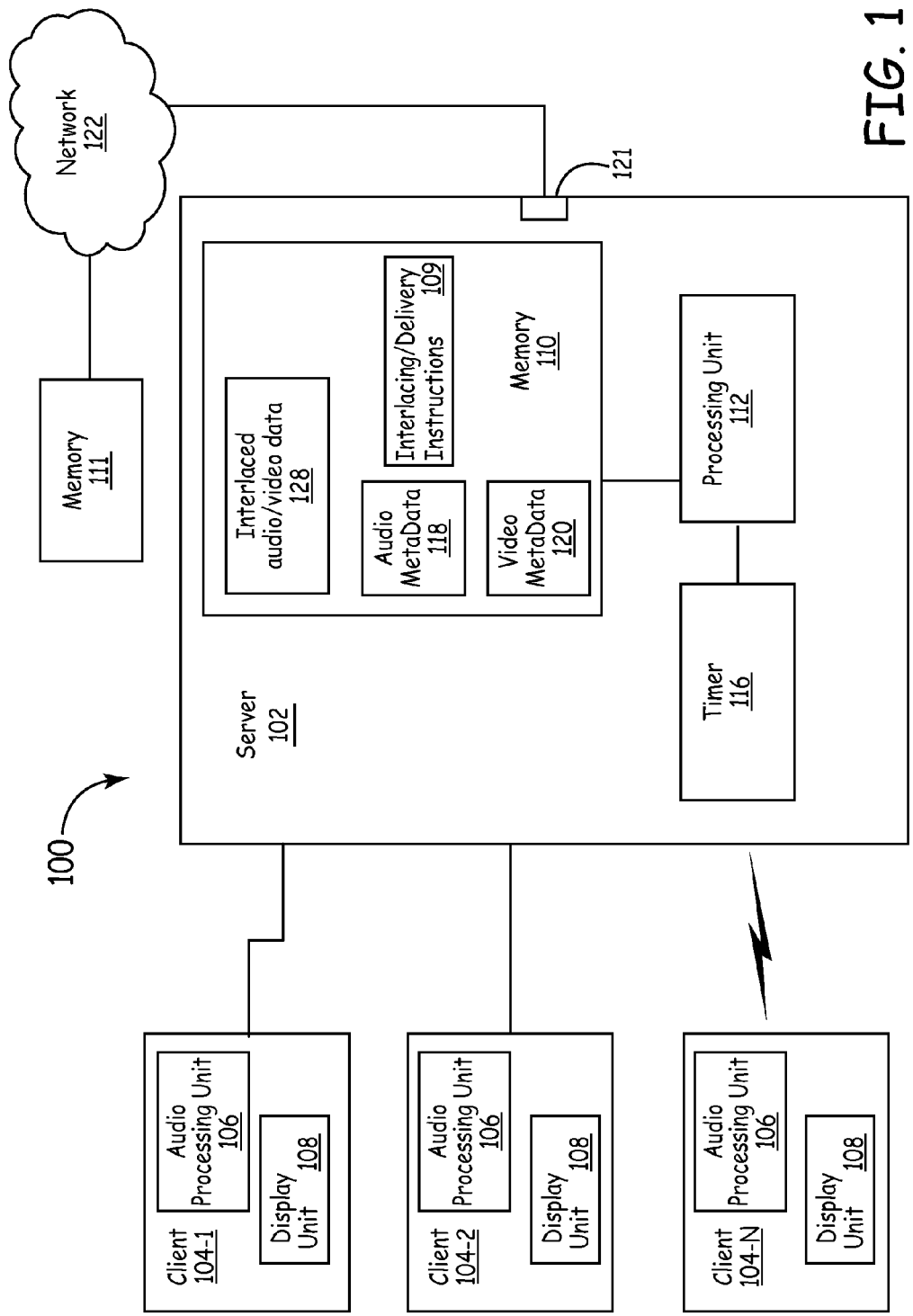
FIG. 1 is a block diagram of one embodiment of a video on demand system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a block diagram of one embodiment of a video on demand system 100. The system 100 includes a server 102 and a plurality of client devices 104-1 . . . 104-N. Each client device 104-1 . . . 104-N includes a display unit 108 for displaying video content and an audio processing unit 106 for producing audio output associated with the video content. The client devices 104-1 . . . 104-N can be implemented as any device capable of displaying video content and processing audio data coming from the server 102. Suitable devices include, but are not limited to, television video monitors, handheld devices (e.g. smartphones and tablet devices), audio receivers, and personal computer systems (e.g. laptops, netbooks, desktop computers). Each client devices 104-1 . . . 104-N can be communicatively coupled to the server 102 via a wired connection (e.g. electrical or optical link) or a wireless connection. In addition, although each display unit 108 and each audio processing unit 106 are depicted in a single physical client 104, in this example, it is to be understood that they are physically separated in other embodiments. For example, each client 104 can be divided into a video client containing a display unit 108 and an audio client containing an audio processing unit 106.

The server includes a memory 110 co-located in the server 102 with the processing unit 112. In some embodiments, the memory 110 is implemented using solid state drives in a Redundant Array of Independent Disks (RAID) configuration. However, it is to be understood that other memory devices can be used in other embodiments. In some embodiments, the memory 110 stores video metadata 120 and corresponding audio metadata 118. Additionally, in some embodiments, video data and audio data are retrieved by the server 102 from an external network 122 coupled to a network port 121 in the server 102. The retrieved audio and video data is then stored on the memory 110 for delivery to the client devices 104-1 . . . 104-N when requested. An external network, as used herein, is a network of components and/or devices that are physically located apart from the device in which the processing unit is located. For example, the external network 122 can be implemented as a local area network, a wide area network, the internet, etc.

The processing unit 112 in server 102 is configured, in this embodiment, to interlace the audio data with the video data to form a single file containing both audio and video data. The single file is also referred to herein as an interlaced audio/video data file. In other embodiments, the audio and video data is preprocessed to form the interlaced audio/video data file. The preprocessed interlaced audio/video data file is then delivered to the server 102. An approximately uniform audio time interval is used between any two consecutive packets of audio data packets within a video stream. For example, in some embodiments, a minimum uniform time interval is used during interlacing. In some embodiments, where audio timestamps are not supplied, the appropriate audio time interval is configured and the audio location is calculated from the video data timestamp to maintain correct audio time intervals. In this embodiment, the interlaced audio/video data 128 is stored on memory 110. The interlaced audio/video data 128 is used to synchronize transmission of the audio and video data when requested by a client device 104, as described below.

Figure 2:
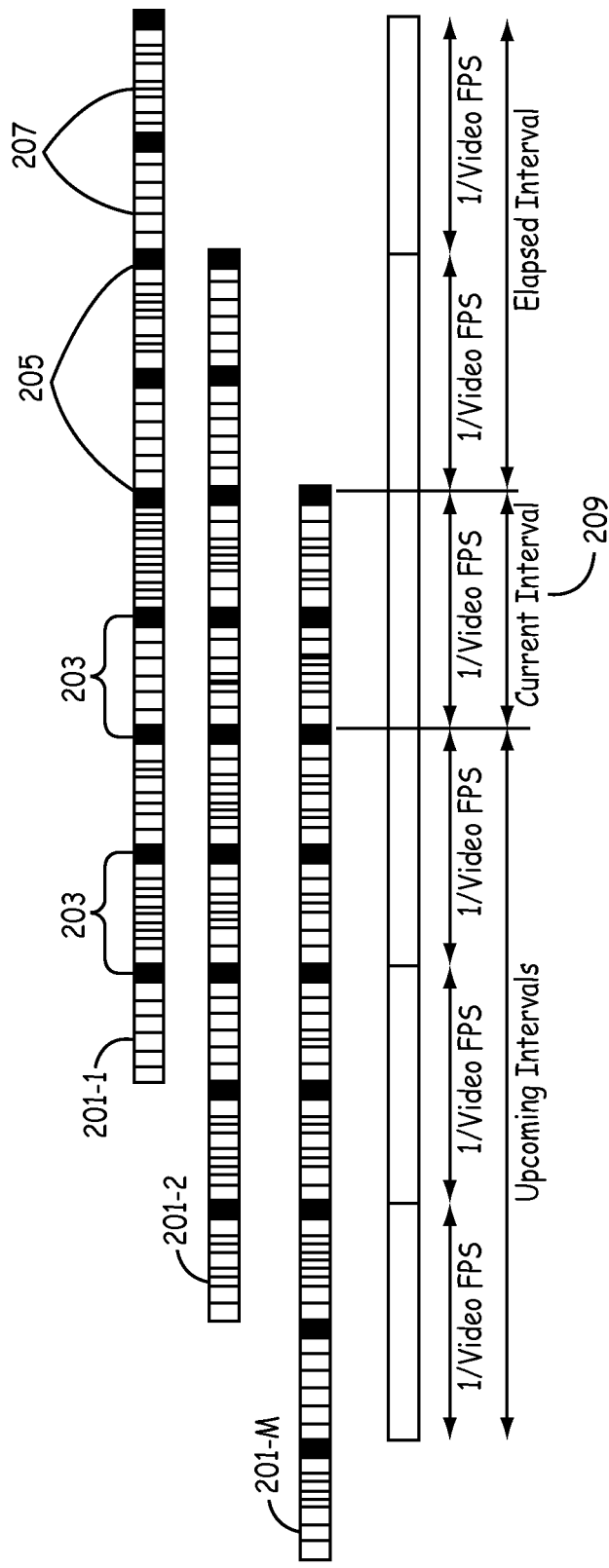
FIG. 2 is a diagram depicting exemplary interlaced streams.

An exemplary depiction of interlaced transmission times is shown in FIG. 2. As shown in FIG. 2, the audio interval 203 between consecutive audio data 205 is the same within each stream 201-1 . . . 201-M. In addition, the audio interval 203 is the same across the multiple streams 201-1 . . . 201-M. Also, as shown in FIG. 2, the audio interval 203 is determined by video timestamp values to account for deviation in frame size. In particular, the audio interval 203, in this example, is consistent despite differentiation in packet size or number. In addition, in some embodiments, the audio interval 203 is one half the video frame rate 209. However, in other embodiments, the audio interval 203 is not half the video frame rate 209. Thus, proper lip synchronization is achieved by maintaining the same audio time interval between consecutive packets of audio information.

The server 102 also includes a single interrupt timer 116 configured to provide interrupt signals to the processing unit 112. In particular, the interrupt timer 116 provides a repeating interrupt signal at a periodic rate. The processing unit 112 outputs requested interlaced streams to the respective client device 104 that requested the streams based on the timing of the interrupt signals from the single timer 116 and the interlaced audio/video data file 128. The audio and video data are output as separate streams on different IP ports. However, the start of transmission of each instance of the audio data packets and corresponding video data packets is synchronized to the interrupts from the timer 116 based on the interlaced audio/video data file 128.

In particular, the audio and video data packets are presorted in the interlaced audio/video data file 128 such that there is an approximately equal time interval for the audio packets in the interlaced audio/video data file 128. The size of the video and audio data packets may vary. Thus, the uniformity of the time intervals is approximately equal as a function of time not as a function of the number of video packets between each audio packet. For example, the last packet in the interlaced audio/video data file 128 can be a video packet in some implementations. The approximately equal time interval is based on the time to send the audio packets.

When the data is to be sent, the presorted audio and video packets in the interlaced audio/video data file 128 are transmitted in order over the respective IP port such that the audio data packets are sent at proper time to reduce pauses and jumps in the audio. In particular, the interrupts from timer 116 are used to determine when to send the next packet in the presorted interlaced audio/video data file 128.

The single precise timer 116 provides interrupts at predetermined intervals (i.e. periodic rate), such as on the order of milliseconds. The periodic rate at which the interrupts are generated can be approximately the same as the interval at which video frames are transmitted (i.e. the video frame rate), in some embodiments. Since the audio data is interlaced with the video data, a separate interrupt timer is not required for delivery of the audio data. In the example shown in FIG. 2, if the video packets 201-1 . . . 201-M are transmitted at 24 frames per second (FPS), the periodic rate for interrupt signals (also referred to as an interrupt interval) can be $\frac{1}{24}$ second.

The processing unit 112, in this embodiment, uses the interrupt interval from the single timer 116 to transmit each instance of a plurality of concurrent audio/video streams. Thus, the processing unit 112 synchronizes the frame rate of all the concurrent audio/video streams as shown in FIG. 2. Indeed, the transmission of each stream is synchronized to begin at the timing of the interrupt signal from the single precise timer 116 even if the request is received in between interrupts. However, the slight delay in beginning transmission, approximately $\frac{1}{24}$ of a second in this example, is substantially imperceptible to a user requesting the video stream.

The processing unit 112 includes or functions with software programs, firmware or other computer readable instructions for carrying out various methods, process tasks, calculations, and control functions, used in interlacing the audio/video data and processing requests for controlling interlaced streams. For example, the processing unit 112 can utilize data describing the frame rate of each interlaced audio/video file for simplified timer configuration; pointers to I-Frames within each file to support navigation commands from the clients; and IP address and port information for each client accepting streams.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk—Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. For example, in the embodiment shown in FIG. 1, the instructions 109 are stored on the memory 110. Suitable processor-readable media may also include transmission media such as electrical, electromagnetic, or digital signals, conveyed via a communication medium such as a network and/or a wireless link.

By using a single timer 116 to synchronize the transmission of each stream and interlacing the audio and video data into a single file, the hardware requirements for server 100 to provide multiple video streams on demand is reduced. In particular, the number of timers and/or performance requirements of the server components is reduced. Thus, system 100 is a cost effective system to provide a plurality of simultaneous streams on demand. System 100 can be implemented in various environments, such as, but not limited to, internet protocol (IP) networks in public transportation systems, corporate office buildings, hotels and in-flight video service on commercial airline flights.

Figure 3:
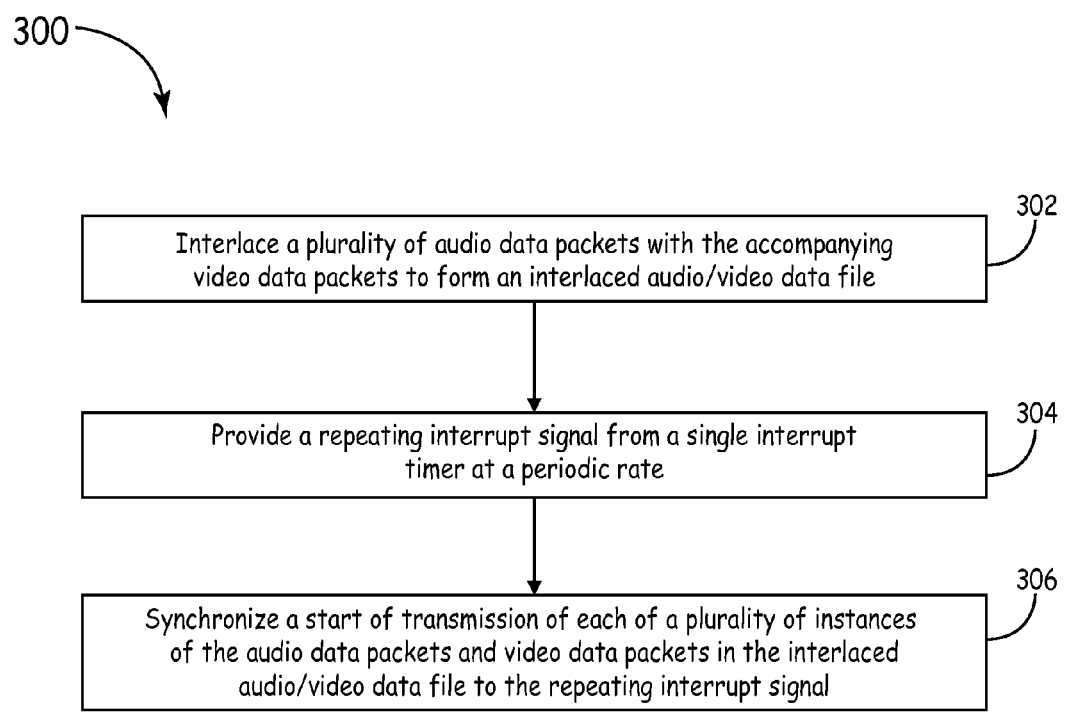
FIG. 3 is a flow chart of one embodiment of a method of implementing synchronized audio and video streaming.

FIG. 3 is a flow chart depicting one embodiment of a method 300 of implementing synchronized audio and video streaming. Method 300 can be implemented in a server such as the server 102 in system 100 above. At block 302, a plurality of audio data packets is interlaced with the accompanying video data to form an interlaced audio/video data file containing both audio and video data. In particular, the audio and video are interlaced such that the time interval between any two consecutive packets of audio information within the video stream is approximately the same. In addition, in some embodiments, interlacing the audio and video data includes deriving the audio time interval from the video data rate to maintain equal audio intervals.

At block 304, a repeating interrupt signal from a single interrupt timer is provided at a periodic rate, as described above. In some embodiments, the periodic rate is approximately equal to the video frame rate of the video data in the interlaced audio/video data file. At block 306, a start of transmission of each of a plurality of instances of the audio data packets and video data packets is synchronized to the repeating interrupt signal. In particular, each instance is streamed in response to a request from a respective client device, as described above. For example, each client device, such as a handheld device or laptop computer, can request a video/audio stream from a server. Thus, each instance of the audio data packets and each instance of the corresponding video data packets is synchronized to the interrupt signals from a single interrupt timer regardless of when the request is received.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A server comprising:
    a processing unit configured to interlace audio data packets with video data packets to form a plurality of interlaced audio/video data streams having an approximately uniform and synchronized audio time interval between consecutive audio data packets in each of the plurality of the interlaced audio/video data streams; and
    a single interrupt timer configured to provide periodic interrupt signals;
    wherein the processing unit is configured to synchronize each instance of a transmission of each instance of the audio data packets and the video data packets with the periodic interrupt signals from the single interrupt timer.

2. The server of claim 1 further comprising a memory;
    wherein the processing unit is configured to store the interlaced audio/video data files streams on the memory.

3. The server of claim 1, wherein the approximately uniform audio time interval is a minimum uniform audio time interval.

4. The server of claim 1, wherein the uniform audio time interval is determined by video timestamp values of the video data packets.

5. The server of claim 1, wherein the interrupt timer is configured to provide a periodic interrupt signal at a rate approximately equal to a video frame rate of the video data packets.

6. The server of claim 2, further comprising a network port configured to communicatively couple the server to an external network; wherein the processing unit is configured to access the audio data packets and the video data packets via the external network and store the audio data packets and the video data packets on the memory.

7. The server of claim 4, wherein the uniform audio time interval is one half video frame rate of the video data packets.

8. A program product comprising a non-transitory processor-readable medium on which program instructions are embodied, wherein the program instructions are configured, when executed by at least one programmable processor, to cause the at least one programmable processor to:
    interlace a plurality of audio data packets with a plurality of video data packets to form a plurality of interlaced audio/video data files streams having an approximately uniform and synchronized audio time interval between consecutive audio data packets in each of the plurality of the interlaced audio/video data streams; and
    synchronize the start of transmission taking place at a server of each of a plurality of instances of the audio data packets and the video data packets in the interlaced audio/video data files streams with the timing of periodic interrupt signals from a single interrupt timer, each of the instances transmitted in response to a request received from a client device.

9. The program product of claim 8, wherein the program instructions are configured to cause the at least one programmable processor to store the interlaced audio/video data files streams on a local memory co-located with the programmable processor.

10. The program product of claim 8, wherein the approximately uniform audio time interval is a minimum uniform audio time interval.

11. The program product of claim 8, wherein the program instructions are configured to cause the at least one programmable processor to retrieve the plurality of audio data packets and the video data packets via an external network and store the retrieved audio data packets and the video data packets on a local memory co-located with the programmable processor.

12. The program product of claim 8, wherein the program instructions are configured to cause the at least one programmable processor to determine the uniform audio time interval from video timestamp values of the video data packets.

13. The program product of claim 12, wherein the program instructions are configured to cause the at least one programmable processor to interlace the plurality of the audio data packets and the video data packets such that the uniform audio interval is one half of the video frame rate of the video data packets.

14. A method of implementing synchronized audio and video streaming, the method comprising:
    interlacing audio data packets with corresponding video data packets to form a plurality of interlaced audio/video data streams having an approximately uniform and synchronized audio time interval between consecutive audio data packets in each of the plurality of the interlaced audio/video data streams;
    providing a repeating interrupt signal from a single interrupt timer at a periodic rate; and
    synchronizing a start of transmission taking place at the server of each of a plurality of instances of the audio data packets and the corresponding video data packets to the repeating interrupt signal.

15. The method of claim 14, further comprising storing the interlaced audio/video data files streams on a memory.

16. The method of claim 14, further comprising:
    retrieving the audio data packets and the video data packets from a memory accessed via an external network; and
    storing the interlaced audio/video data file on a memory co-located with a processing unit configured to interlace the retrieved audio data packets and the retrieved video data packets.

17. The method of claim 14, wherein the approximately uniform audio time interval is a minimum uniform audio time interval.

18. The method of claim 14, further comprising determining the uniform audio time interval from video timestamp values of the video data packets.

19. The method of claim 14, wherein providing the repeating interrupt signal further comprises providing the repeating interrupt signal at a periodic rate that is approximately equal to a video frame rate of the video data packets.

20. The method of claim 18, wherein the uniform audio time interval is one half a video frame rate.

* * * * *